United States Patent
Soga et al.

(10) Patent No.: US 6,806,906 B1
(45) Date of Patent: Oct. 19, 2004

(54) DIGITAL STILL CAMERA WITH COMPOSITION ASSIST FUNCTION, AND METHOD OF CONTROLLING OPERATION OF SAME

(75) Inventors: Takashi Soga, Asaka (JP); Masafumi Hirata, Asaka (JP); Minoru Arai, Tokyo (JP); Akihisa Yamazaki, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/525,918

(22) Filed: Mar. 15, 2000

(30) Foreign Application Priority Data

Mar. 15, 1999 (JP) ............................................ 11-067891

(51) Int. Cl.[7] .............................................. H04N 5/222
(52) U.S. Cl. .................................................. 348/333.03
(58) Field of Search ..................... 396/296; 348/333.01, 348/333.02, 333.03

(56) References Cited

U.S. PATENT DOCUMENTS 5,687,408 A * 11/1997 Park ............................ 396/296
5,873,007 A * 2/1999 Ferrada Suarez ........... 396/296

* cited by examiner

*Primary Examiner*—Wendy R. Garber
*Assistant Examiner*—Rashawn Tillery
(74) *Attorney, Agent, or Firm*—Birch, Stewart, Kolasch & Birch, LLP

(57) ABSTRACT

The image of a subject is displayed on a display screen of a liquid crystal display device provided on the back side of a digital camera. An assistance frame is displayed in a form superimposed on the image of the subject and the composition of a photograph to be obtained by shooting the subject is decided based upon the assistance frame. As the user decides the composition of a photograph in accordance with the assistance frame, the user acquires a well-balanced photographic technique.

7 Claims, 14 Drawing Sheets

DIGITAL STILL CAMERA WITH COMPOSITION ASSIST FUNCTION, AND METHOD OF CONTROLLING OPERATION OF SAME

BACKGROUND OF THE INVENTION

1. Field of the Invention

This invention relates to a digital still camera equipped with a display unit for displaying the image of a subject and with a composition assist function, and to a method of controlling operation of the camera.

2. Description of the Related Art

When a beginner takes a picture, the subject often is placed in the center of the imaging area. Images obtained by such photography therefore have a monotonous composition. And when a person is photographed with scenery as the background, the person often appears too small.

Thus, a beginner who is not accustomed to taking pictures with a camera does not possess a skilled photographic technique.

DISCLOSURE OF THE INVENTION

Accordingly, an object of the present invention is to improve the photographic technique of a beginner who is not accustomed to taking pictures.

According to the present invention, the foregoing object is attained by providing a digital still camera equipped with a composition assist function, comprising: an imaging unit for sensing the image of a subject and outputting image data representing the image of the subject; a display unit for displaying the image of the subject represented by the image data output from the imaging unit; a display controller (display control means) for controlling the display unit so as to display assistance lines, which are for deciding composition for the purpose of taking a picture of the subject, in a form superimposed on the image of the subject being displayed on the display unit; and a recording controller (recording control means) responsive to depression of a shutter-release button for recording the image data, which is output from the imaging unit, on a recording medium.

The present invention provides also a method of controlling operation of the camera described above. Specifically, the present invention provides a method of controlling operation of a digital still camera equipped with a composition assist function, the camera having an imaging unit for sensing the image of a subject and outputting image data representing the image of the subject, a display unit for displaying the image of the subject represented by the image data output from the imaging unit, and a recording controller (recording control means) responsive to depression of a shutter-release button for recording the image data, which is output from the imaging unit, on a recording medium, the method including a step of controlling the display unit so as to display assistance lines, which are for deciding composition for the purpose of taking a picture of the subject, in a form superimposed on the image of the subject being displayed on the display unit.

In accordance with the present invention, the image of a subject is displayed on the display unit. The aforementioned assistance lines for deciding the composition of the picture are displayed in a form superimposed on the image of the subject being displayed on the display unit.

While observing the assistance lines being displayed on the display unit, the user decides the composition of the subject in such a manner that the subject is disposed in accordance with the assistance lines. Even a beginner, therefore, can use freely a variety of photographic techniques. By repeating photography in accordance with the assistance lines while the assistance lines are being displayed on the display unit, even a beginner can acquire a variety of photographic techniques.

A single assistance line may be used, or the assistance lines may define a frame which indicates the placement of the subject.

The camera may further include a display command switch for applying a command to display the aforesaid assistance lines. In such case the display controller displays the assistance lines on the display unit in response to the display command applied by the display command switch.

The assistance lines can be displayed when they are necessary. Thus, it can be so arranged that annoying assistance lines are not displayed for a user who has acquired photographic technique.

The camera may further include a display control command switch for applying a command that is for the purpose of controlling the display unit. In such case the display controller responds to a first command from the display control command switch by turning the display unit on to display the image of the subject, responds to a second command from the display control command switch by displaying the assistance lines in a form superimposed on the image of the subject, and responds to a third command from the display control command switch by turning off the display unit.

Thus, the on/off state of a display on the display unit and display of the assistance lines can be controlled using the display control switch.

The camera may further include a move-command input unit for inputting a command to move the position at which the assistance lines are displayed. In such case the display controller responds to a move command entered from the move-command input unit by displaying the assistance lines upon moving them.

Thus, the user can move the assistance-line display position as necessary.

In a case where the shutter-release button is capable of being pressed through first and second stroke lengths, the display of the assistance lines is presented on the display unit in response to depression of the shutter-release button through its first stroke length, and the image data output from the imaging unit is recorded on the recording medium in response to depression of the shutter-release button through its second stroke length.

Thus, display of the assistance lines can be controlled in response to depression of the shutter-release button. The shutter-release button is pressed through its first stroke length when the composition is to be decided. Consequently, the assistance lines are displayed on the display unit in order to decide the composition at such time that the shutter-release button has been pressed through its first stroke length. When the composition is decided in accordance with the assistance lines, the shutter-release button is pressed through its second stroke length so that the image data representing the image of the subject will be recorded on the recording medium.

The camera may further be provided with adjustment means for performing at least one of exposure adjustment and focus adjustment based upon image data representing an image within an area specified by the assistance lines.

Since the photographic composition is decided in accordance with the assistance lines, it is construed that the main subject lies within the area defined by the assistance lines. Because processing such as exposure adjustment and focus adjustment is executed based upon the image data representing the image within the area specified by the assistance lines, exposure and focus adjustment suitable for shooting the main subject can be realized.

In a case where the camera is further equipped with a strobe for illuminating the subject with auxiliary light and the assistance lines displayed on the display unit define a frame for portrait photography, it is desired that the frame for portrait photography be displayed on the display unit in a relationship identical with the positional relationship of the strobe disposed on the front side of the camera.

In case of portrait photography, the head of the person serving as the main subject is at the top of the picture. If the main subject is shot while the digital camera is held vertically or horizontally, the strobe may be situated at the bottom. If the strobe is situated at the bottom, the strobe light will illuminate the subject from below and cause a shadow to be cast on the main subject.

When the frame for portrait photography is displayed on the display unit, the frame for portrait photography assumes a relationship identical with the positional relationship of the strobe on the front side of the camera. When the frame is displayed at the top of the display screen of the display unit, the strobe also will be at the top on the front side of the camera. By deciding the composition in such a manner that the face of the person who is the main subject falls within the frame for portrait photography, the strobe light will illuminate the main subject from above. This makes it possible to prevent a shadow from being cast on the image of the main subject.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A preferred embodiment of the present invention will now be described in detail with reference to the drawings.

Figure 1:
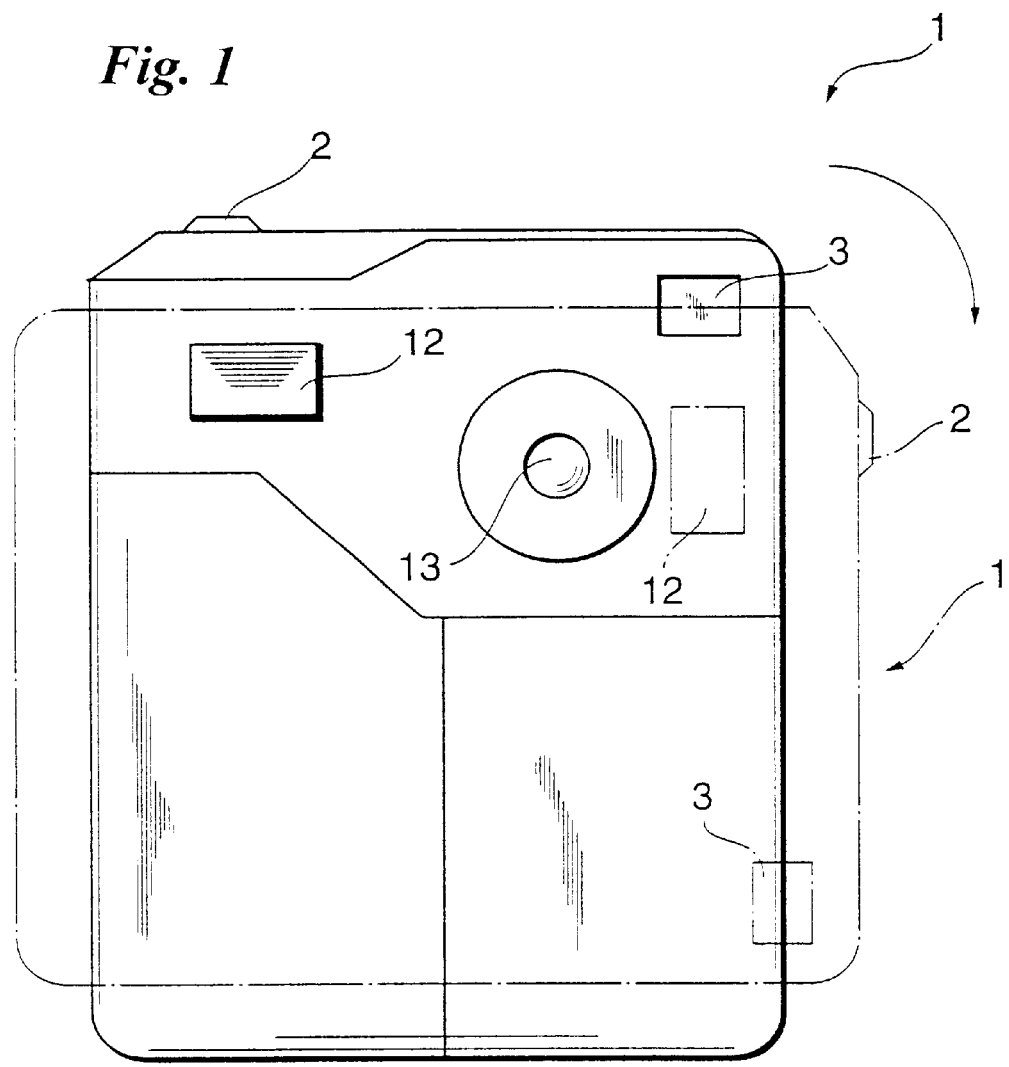
FIG. 1 is a front view of a digital still camera.
Figure 2:
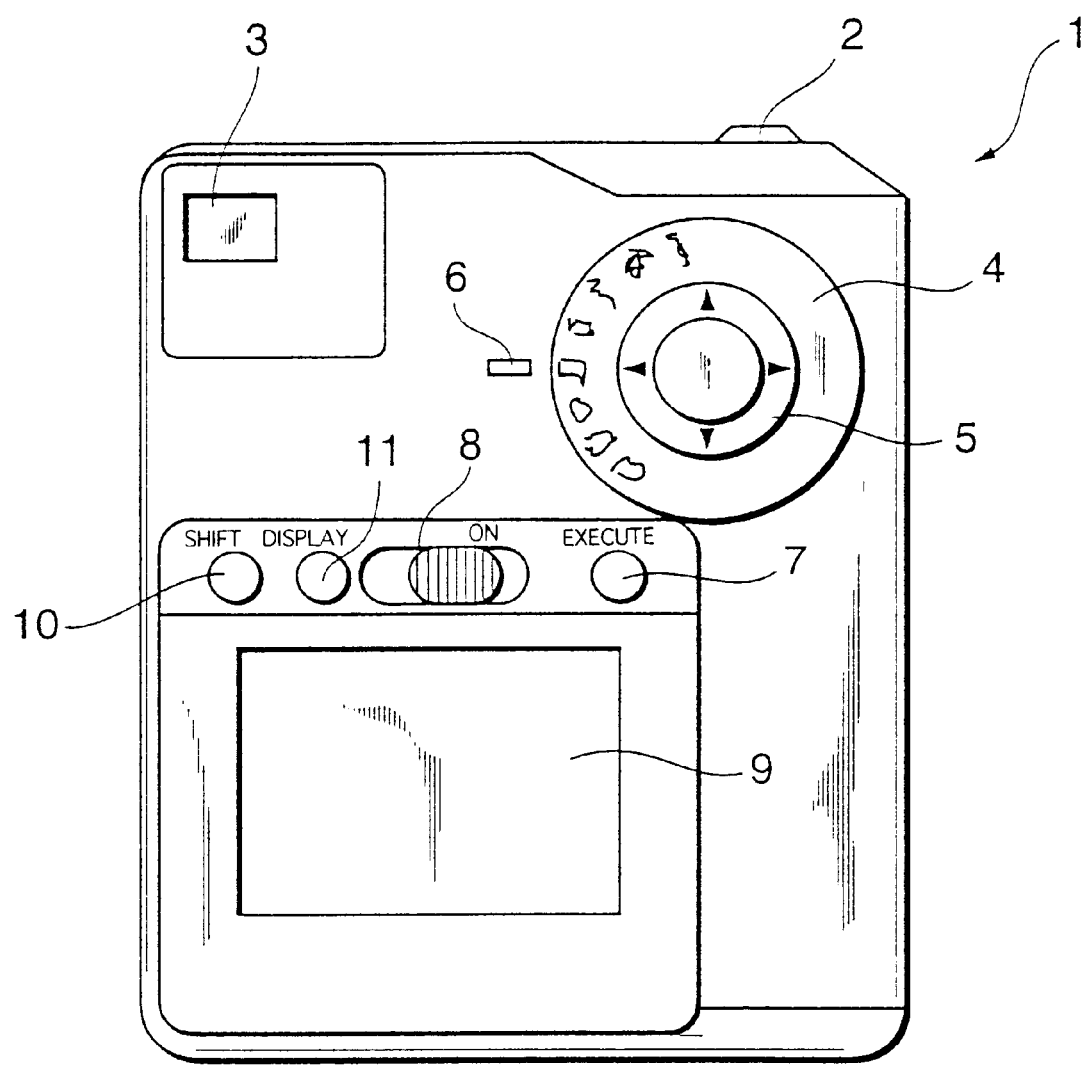
FIG. 2 is a back view of the digital still camera.

FIGS. 1 and 2 are a front view and back view, respectively, showing the external appearance of a digital still camera 1 according to an embodiment of the present invention.

As shown in FIG. 1, the digital still camera 1 has a front side the upper right corner of which is formed to have an optical viewfinder 3. A taking lens 13 is formed below the optical viewfinder 3.

The front side of the digital still camera 1 is further formed to include a strobe light-emission unit 12 at its upper left corner.

Provided on the top of the digital still camera 1 is a shutter-release button 2 on the left side of the camera when viewed from the front. The shutter-release button 2 is of the type pressed through first and second stroke lengths.

As shown in FIG. 2, the back side of the digital still camera 1 is provided at its upper right corner with a mode setting dial 4. An index mark 6 is at the left side of the mode setting dial 4. The mode setting dial 4 is capable turning freely. A desired mode such as a shooting mode or set-up mode among various modes formed on the mode setting dial 4 is set by positioning the desired mode at the index mark 6.

An up, down, left, right button 5 is formed within the mode setting dial 4, and the button 5 is formed to have up, down, left and right arrows. Each arrow mark is formed so as to be capable of being pressed.

A liquid crystal display device 9 is provided on the back of the digital still camera 1 on the lower side thereof and displays the image of a subject obtained by imaging.

Various operating buttons are formed on the display screen of the liquid crystal display device 9. The operating buttons include a shift button 10, a display button 11, a power switch 8 and an execute button 7.

When imaging is performed in the state illustrated in FIGS. 1 and 2, a captured image in the horizontal format is obtained (horizontal photography). On the other hand, if imaging is performed upon rotating the camera 1 clockwise 90° from the attitude for horizontal photography, as indicated by the phantom lines in FIG. 1, a captured image in the vertical format will be obtained (vertical photography).

Figure 3:
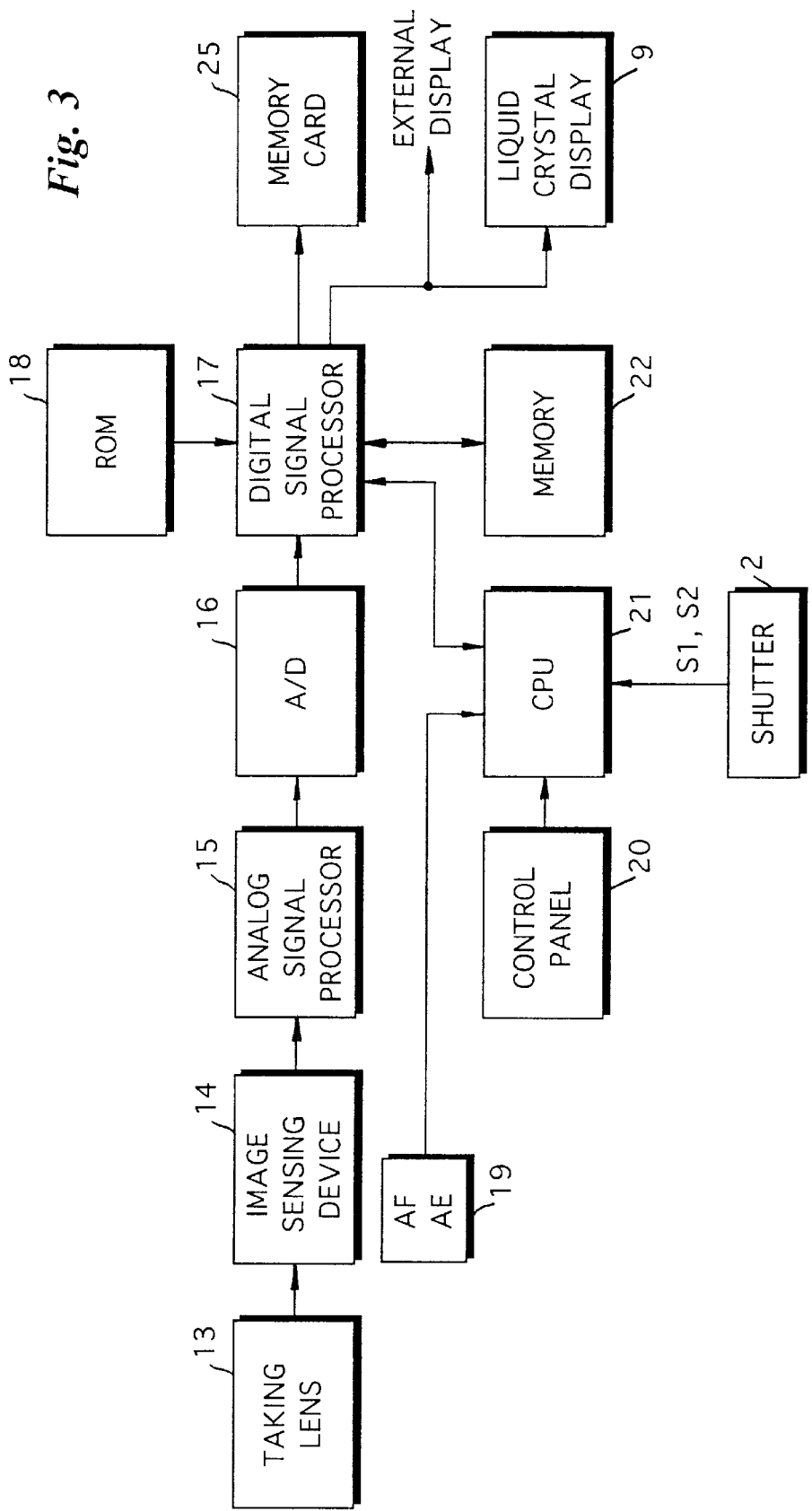
FIG. 3 is a block diagram illustrating the electrical construction of a digital still camera according to the present invention.

FIG. 3 is a block diagram illustrating the electrical construction of the digital still camera 1.

The overall operation of the digital still camera 1 is controlled by a CPU 21.

Signals S1 and S2 indicative of depression of the shutter-release button 2 through its first and second stroke lengths, respectively, enter the CPU 21 from the shutter-release button 2. Also input to the CPU 21 are signals indicating operating commands from a control panel 20 including the operating buttons, which include the shift button 10, the display button 11, the power switch 8 and the execute button 7, as well as the mode setting dial 4 and up, down, left, right button 5.

The digital still camera 1 is capable of autofocus and auto exposure adjustments. An AF and AE circuit 19 is provided for this purpose. If the shutter-release button 2 is pressed through its first stroke length, autofocus and auto exposure adjustments are made by the AF and AE circuit 19. AF and AE signals from the AF and AE circuit 19 are input to the CPU 21.

The image of a subject is formed on the photoreceptor surface of an image sensing device 14 by the taking lens 13. If the shooting mode is set by the mode setting dial 4, an analog video signal representing the image of the subject is output from the image sensing device 14 and enters an analog video signal processing circuit 15.

The analog video signal processing circuit 15 executes analog signal processing such as a gamma correction and white balance adjustment. The video signal output from the analog video signal processing circuit 15 enters an analog/digital conversion circuit 16, which converts the signal to digital image data. The latter is input to a digital signal processing circuit 17.

The image data that is input to the digital signal processing circuit 17 is applied to a memory 22, where the data is stored temporarily. The image data is read out of the memory 22 and is subjected to digital signal processing, such as processing for the generation of luminance and color difference data input, in the digital signal processing circuit 17.

If the shutter-release button 2 is pressed through its second stroke length, the image data output from the digital signal processing circuit 17 is applied to a memory card 25, where the data recorded. The image data that is output from the digital signal processing circuit 17 is applied to a liquid crystal display device 9, whereby the image of the subject obtained by imaging is displayed.

The digital still camera 1 contains a ROM 18 storing image data representing an assistance frame (assistance lines) for assisting the user in composing the picture of a subject.

The image data representing the assistance frame stored in the ROM 18 is read out and applied to the digital signal processing circuit 17. The latter executes image combining processing in such a manner that the assistance frame is displayed in a form superimposed on the image of the subject obtained by imaging. By displaying the image data resulting from image combining processing on the liquid crystal display device 9, the assistance frame is displayed while superimposed on the image of the subject being displayed on the display screen of the liquid crystal display device 9.

Figure 4:
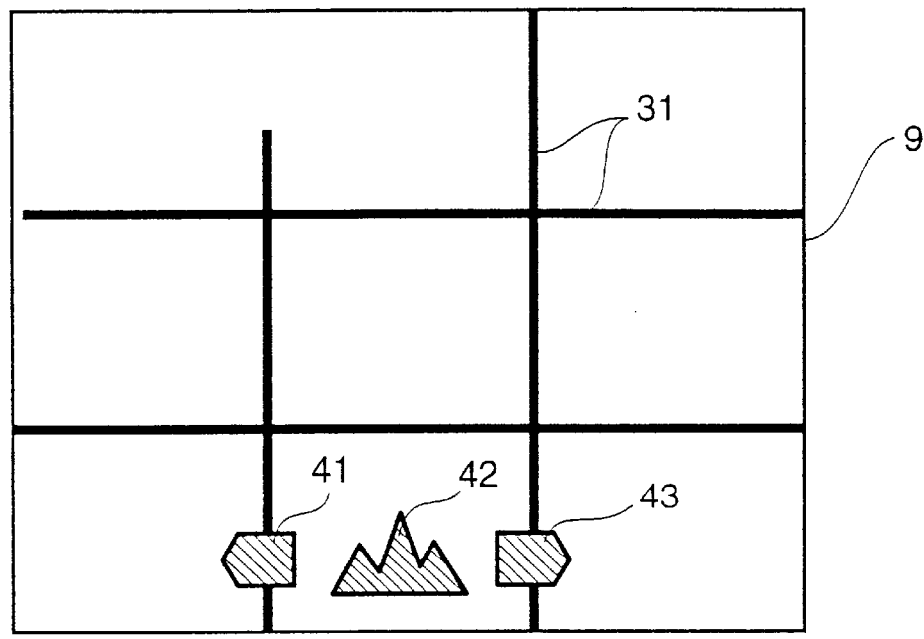
FIGS. 4 to 6 illustrate examples of assistance frames.
Figure 5:
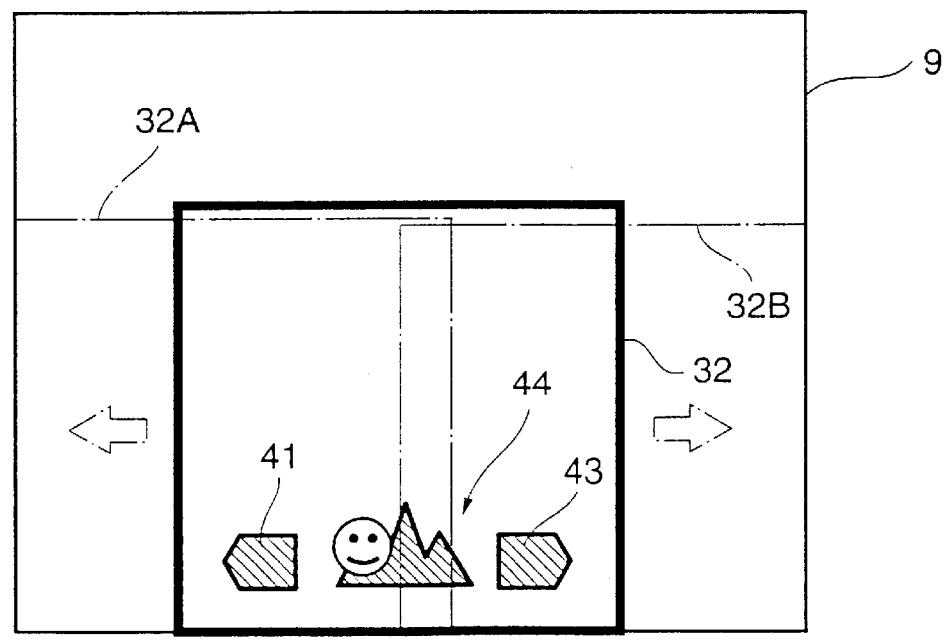
Figure 6:
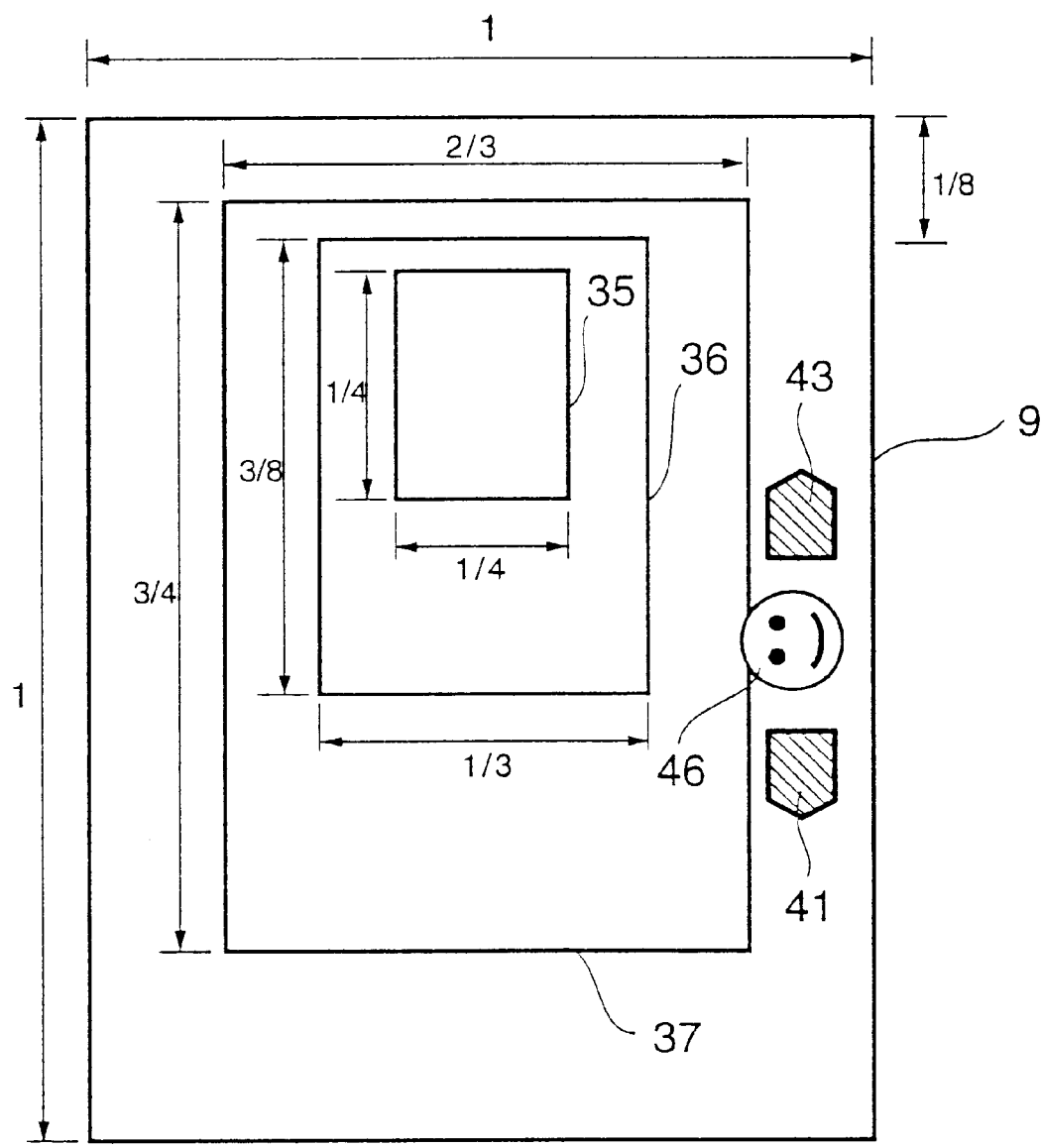

FIGS. 4 to 6 illustrate examples of assistance frames.

FIG. 4 shows an example of an assistance frame for photographing scenery.

The assistance frame for scenic photography is an intersection-of-thirds assistance frame 31, which is for dividing the picture-taking area into three equal sections vertically and three equal sections horizontally. The composition is decided in such a manner that foreground and background are photographed upon being divided into the areas divided by the intersection-of-thirds assistance frame 31. Even a beginner can be prevented from obtaining a composition in which the main subject is always present at the center of the picture-taking area or a divided composition in which the foregoing and the background each take up half of the picture. This makes it possible to shoot with excellent balance. Further, since the horizontal and vertical directions can be verified, shooting can be performed more stably.

Icons 41 and 43 indicating that there are other assistance frames and an icon 42 indicating this frame is an assistance frame suitable for scenic photography also are displayed on the display screen of the liquid crystal display device 9.

FIG. 5 shows an example of an assistance frame for photographing a person with scenery as the background.

The assistance frame for photographing a person with scenery as the background is a person-shooting assistance frame 32 in which the horizontal and vertical directions of the frame each take up two-thirds of the picture-shooting area. By shooting in such a manner that the person to be imaged falls within the assistance frame 32, it is possible to prevent the person from appearing too small in comparison with the scenery. The assistance frame 32 can be moved leftward as indicated by the phantom lines 32A and rightward as indicated by the phantom lines 32B, as will be described later.

An icon 44 indicating that this frame is the person-shooting assistance frame 32 is displayed on the display screen of the liquid crystal display device 9.

FIG. 6 shows an example of assistance frames for portrait photography.

The assistance frames for portrait photography include an assistance frame 37 for taking a close-up of a face, an assistance frame 36 for taking a bust shot, and an assistance frame 35 for taking a knee shot. These assistance frames are for vertical photography. With the assistance frame 37, the size and position of the frame have been decided so as to obtain an excellent composition when a close-up is taken of a face. In vertical photography, the horizontal direction of the frame has a size that is two-thirds of the picture-taking area and the vertical direction of the frame has a size that is three-fourths of the picture-taking area. With the assistance frame 36, the size and position of the frame have been decided so as to obtain an excellent composition when a bust shot is taken. The horizontal direction of the frame has a size that is one-third of the picture-taking area and the vertical direction of the frame has a size that is three-eighths of the picture-taking area. With the assistance frame 35, the size and position of the frame have been decided so as to obtain an excellent composition when a knee shot is taken. The horizontal and vertical directions of the frame each have a size that is one-fourth of the picture-taking area.

An icon 46 indicating that these are frames for portrait photography is displayed for photography in the portrait format as well.

When portrait photography is performed, the camera is held for vertical photography. At such time the assistance frame 35, 36 or 37 for portrait photography will have a relationship identical with the positional relationship of the strobe 12 on the front side of the camera 1. When the assistance frame 35, 36 or 37 for portrait photography is displayed at the top of the display screen of the display device 9, the strobe 12 also will be at the top of the front side of the camera 1. By deciding the composition in such a manner that the face of the person who is the main subject will fall within the assistance frame 35, 36 or 37 for portrait photography, the light from the strobe will illuminate the main subject from above. This makes it possible to prevent a shadow from being cast upon the main subject.

Image data representing the assistance frames shown in FIGS. 4 to 6 has been stored in the ROM 18. By reading this data out of the ROM 18, an assistance frames is displayed on the image of the subject displayed on the liquid crystal display device 9.

Figure 7:
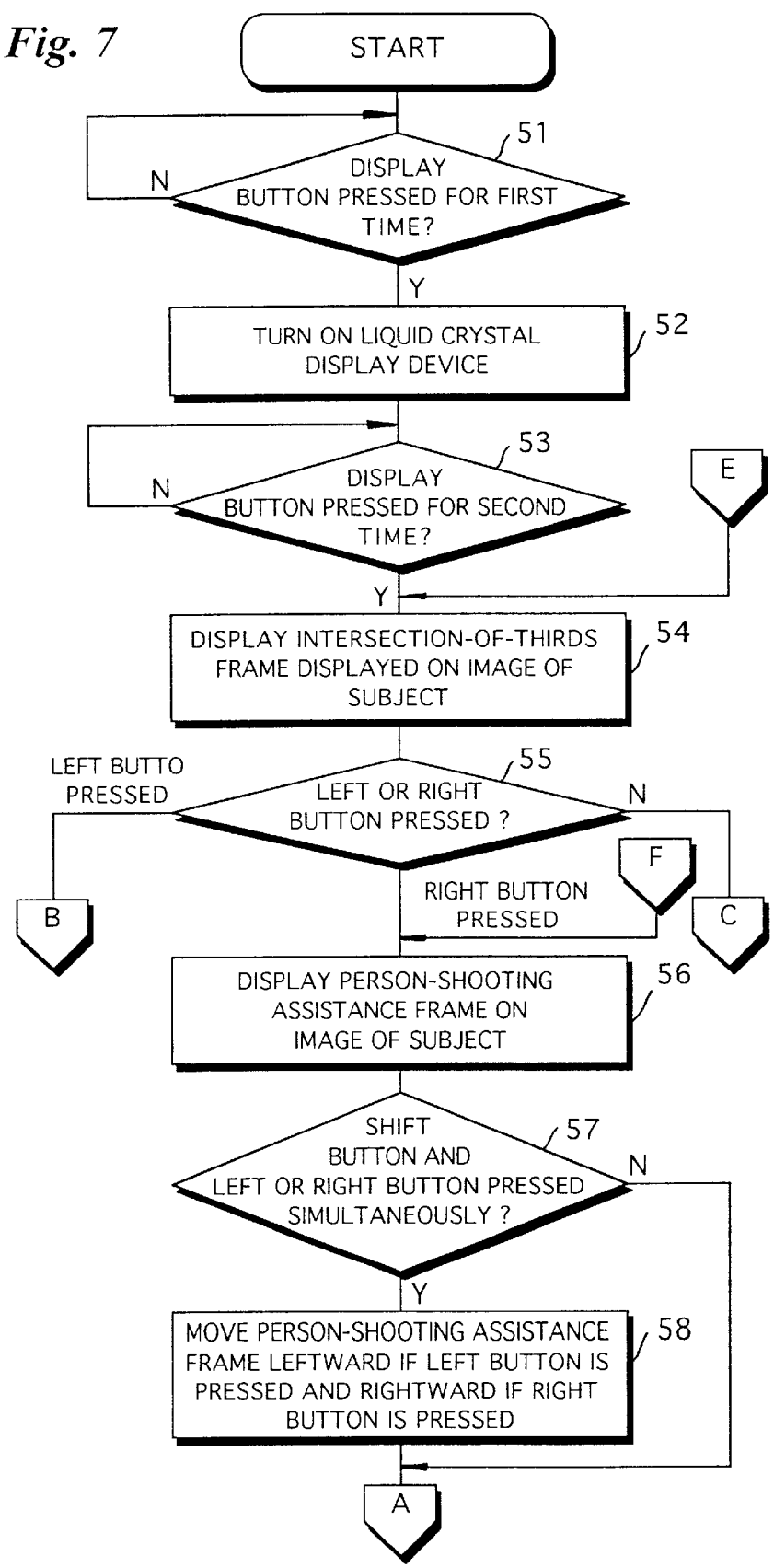
FIGS. 7 and 8 are flowcharts illustrating the processing procedure of the digital still camera.
Figure 8:
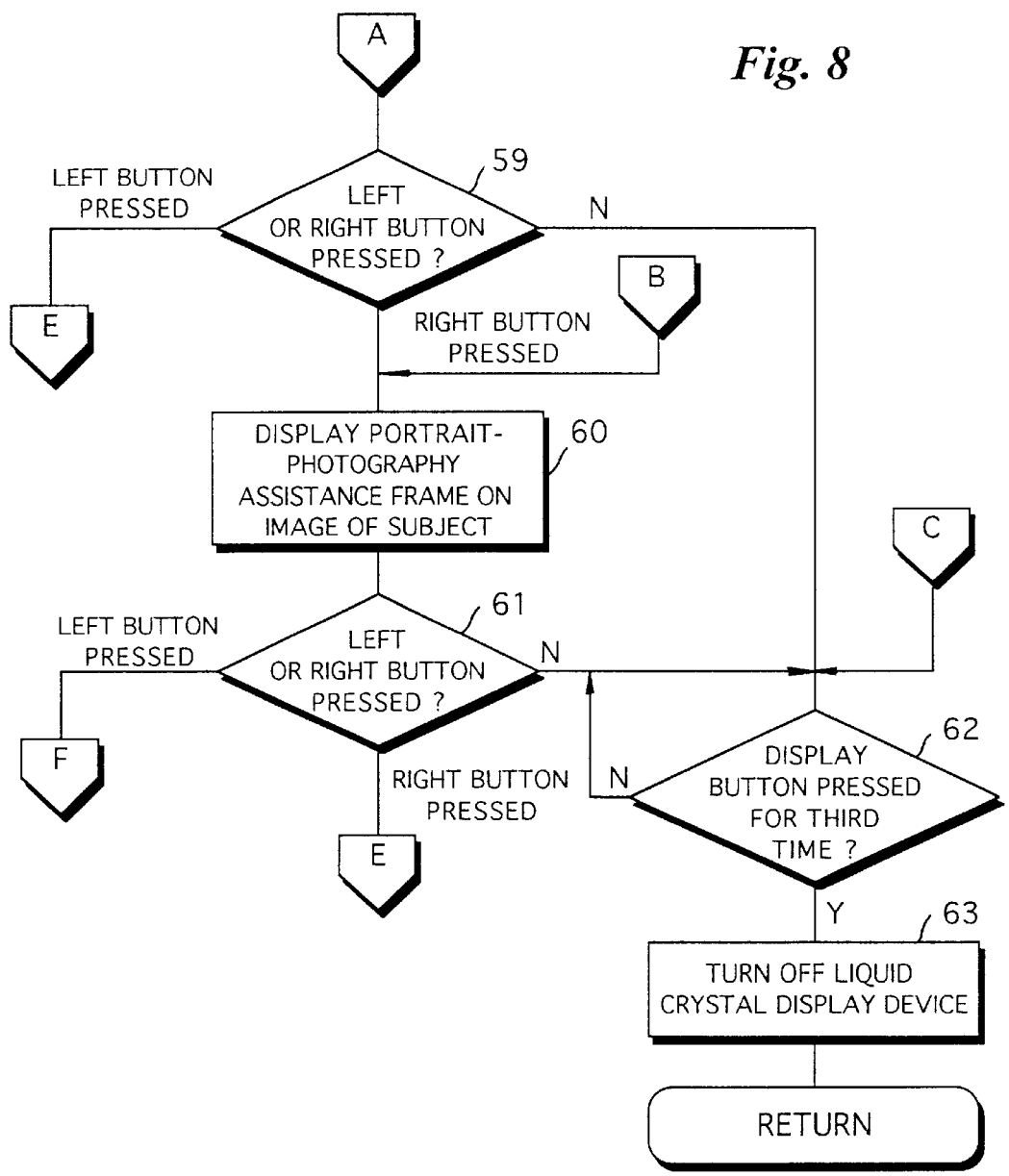

FIGS. 7 and 8 are flowcharts illustrating the procedure of processing for presenting a display on the display screen of the liquid crystal display device of the digital still camera.

FIGS. 9 to 13 illustrate examples of images displayed on the liquid crystal display device 9. In these figures the icons indicating what kind of photography is suitable and the icons indicating other available assistance frames are deleted from the drawings.

If the display button 11 is pressed (for the first time) after the power switch 8 of the digital still camera has been turned on ("YES" at step 51), the liquid crystal display device 9 turns on and the image of the subject obtained by imaging is displayed on the display screen of the liquid crystal display device 9 (step 52).

Figure 9:
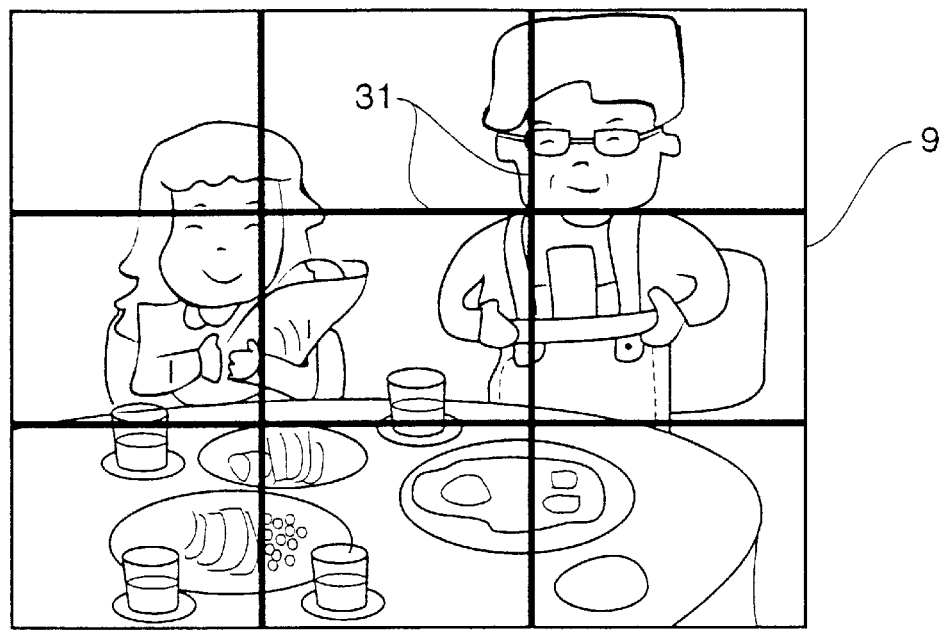
FIGS. 9 to 13 show examples of images displayed on a display screen of a liquid crystal display device.

If the display button 11 is pressed again (i.e., for the second time) ("YES" at step 53), then the intersection-ofthirds assistance frame 31 is displayed, in a form superimposed upon the captured image, on the display screen of the liquid crystal display device 9 as shown in FIG. 9 (step 54). While observing the assistance frame 31 being displayed on the display screen of the liquid crystal display device 9, the user decides the composition of the shot. This makes it possible to shoot in accordance with the intersection-of-thirds method in comparatively simple fashion.

If the left or right button of the up, down, left, right button 5 is pressed, another assistance frame instead of the intersection-of-thirds assistance frame 31 is displayed on the display screen of the liquid crystal display device 9.

Figure 10:
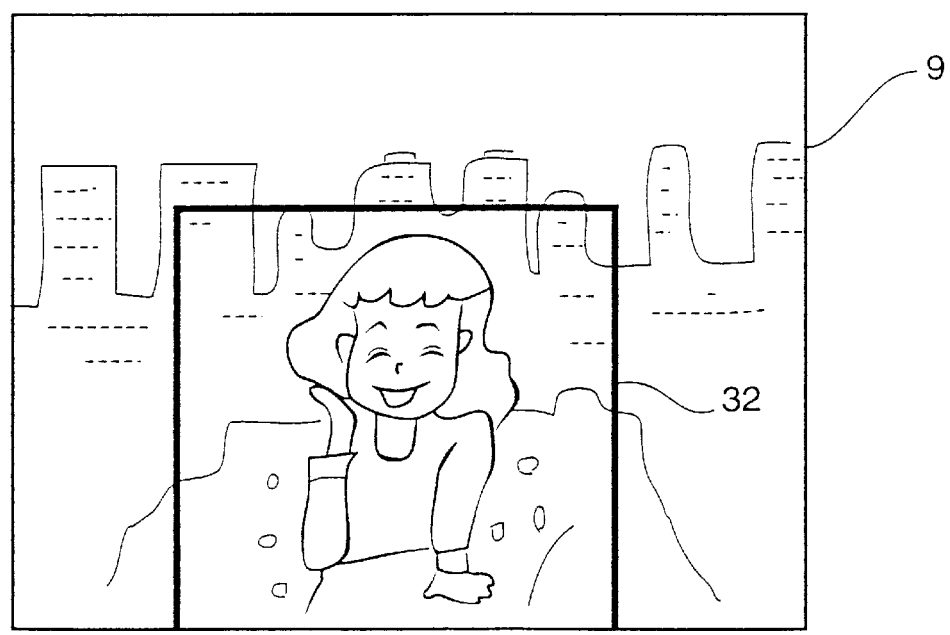
Figure 11:
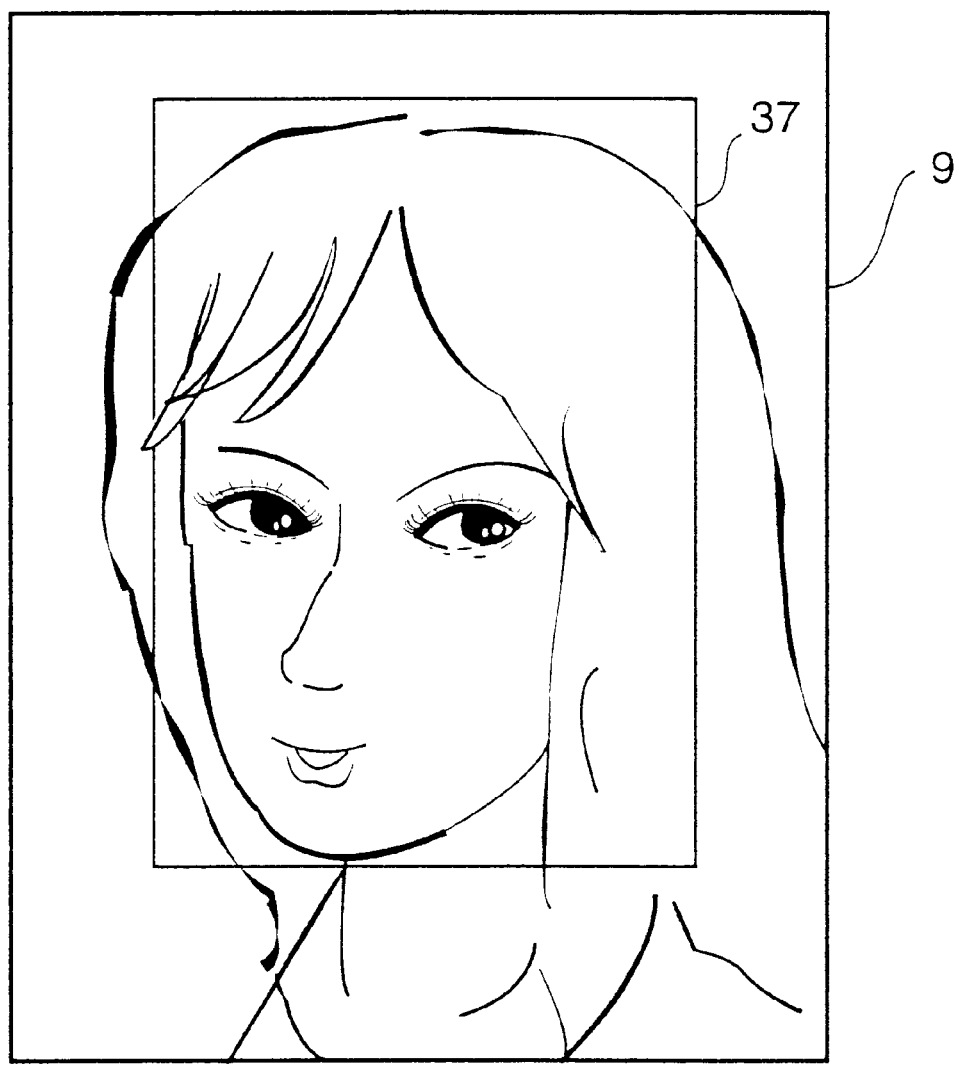

If the left button is pressed, the assistance frame 37 for portrait photography of the kind shown in FIG. 11 is displayed on the display screen of the liquid crystal display device 9 (step 60). If the right button is pressed, the person-shooting assistance frame 32 of the kind shown in FIG. 10 is displayed on the display screen of the liquid crystal display device 9 (step 56).

If the left or right button is pressed while the shift button 10 is held down with the person-shooting assistance frame 32 being displayed on the display screen of the liquid crystal display device 9 in the manner shown in FIG. 10 (step 57), the person-shooting assistance frame 32 will be moved to the left or right depending upon whether the left or right button is pressed (step 58). This makes it possible to photograph a person at the appropriate size not only when the person is centered but also when the person is offset to the left or right side of the picture-taking area (see assistance frames 32A, 32B in FIG. 5).

If the left button is pressed, the assistance frame 31 based upon the intersection-of-thirds method is displayed on the display screen of the liquid crystal display device 9 again. If the right button is pressed, the assistance frame 37 for portrait photography of the kind shown in FIG. 11 is displayed, in a form superimposed on the captured image, on the display screen of the liquid crystal display device 9 (step 60).

If the left button is pressed while the assistance frame 37 for portrait photography is being displayed, the person-shooting assistance frame 32 of the kind shown in FIG. 10 is displayed on the display screen of the liquid crystal display device 9 again. If the right button is pressed, the assistance frame 31 of FIG. 9 based upon the intersection-of-thirds method is displayed on the display screen of the liquid crystal display device 9.

If the display button 11 is pressed again (i.e., for the third time) ("YES" at step 62), then the liquid crystal display device 9 turns off (step 63).

It goes without saying that the image data representing the image of the subject is recorded on the memory card 25 by pressing the shutter-release button 2 through its first and second stroke lengths during execution of the above-described processing.

Figure 12:
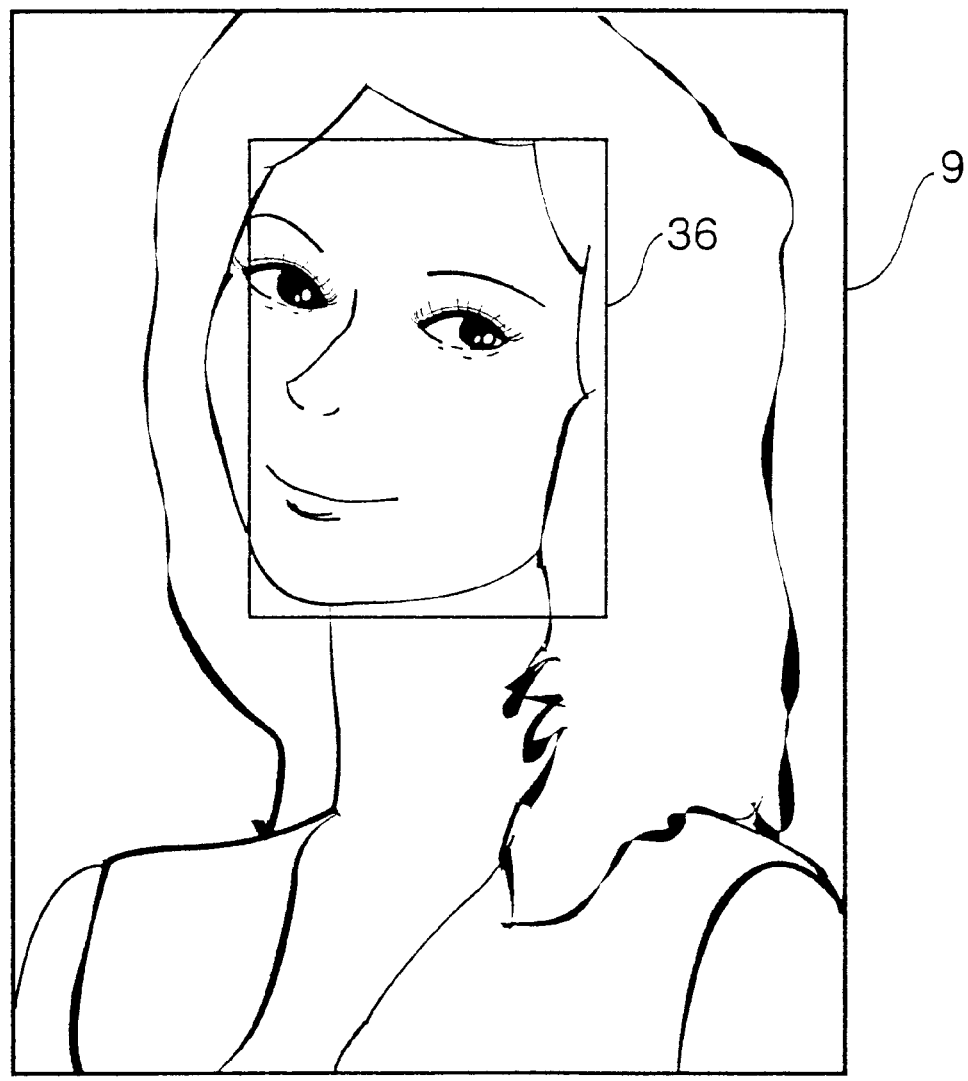
Figure 13:
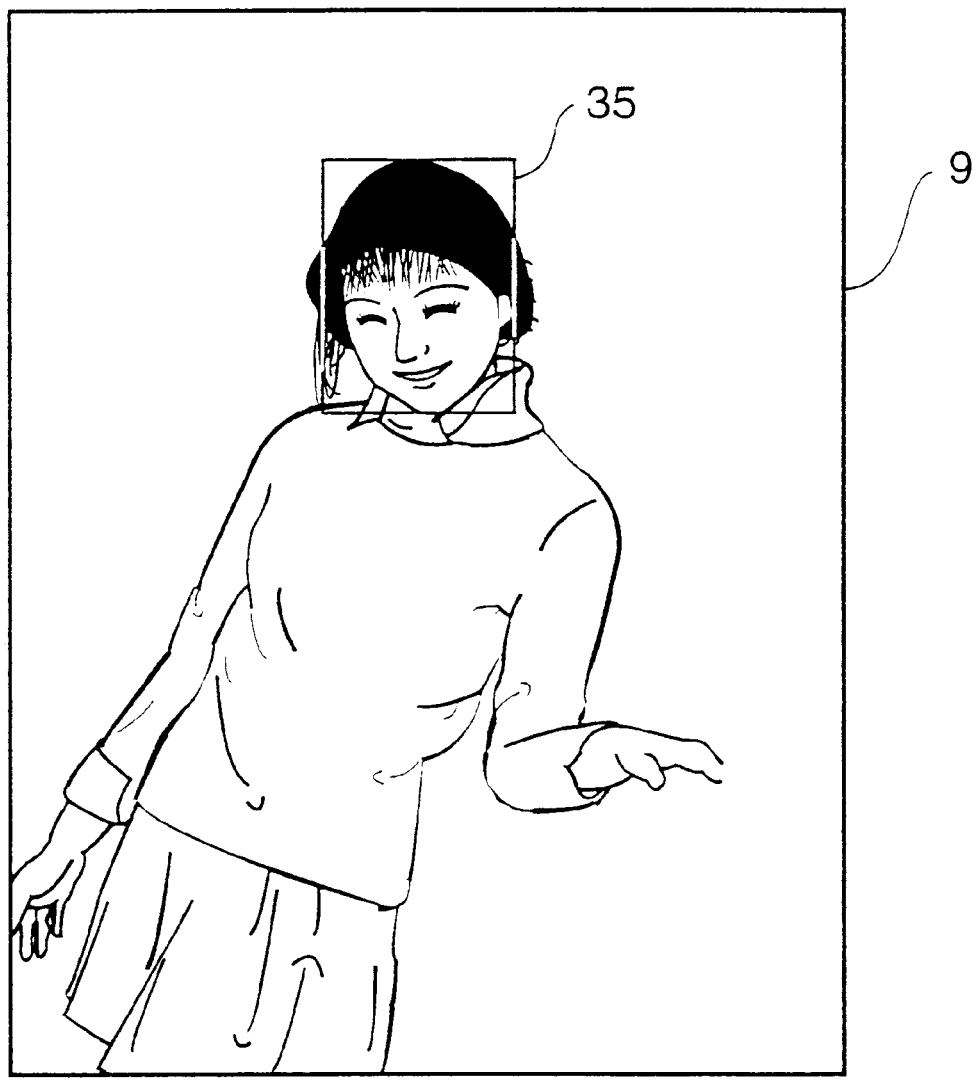

In the embodiment described above, the intersection-of-thirds assistance frame 31 is displayed if the right button is pressed while the assistance frame 37 for portrait photography shown in FIG. 11 is being displayed. However, an arrangement may be adopted in which the portrait assistance frame 36 for bust shots shown in FIG. 12 is displayed on the display screen of the liquid crystal display device 9 by pressing the right button while the assistance frame 37 for portrait photography shown in FIG. 11 is being displayed. Furthermore, an arrangement may be adopted in which the assistance frame 35 for full-body photography is displayed on the display screen of the liquid crystal display device 9 in the manner shown in FIG. 13.

Since a composition can also be decided upon erasing the assistance frames, the assistance frames do not present an annoyance at such time.

Further, since the selection of an assistance frame involves merely operating the display button 11, extra buttons need not be provided. In person photography shown in FIG. 10 and portrait photography shown in FIG. 11, the main subject often is present within the assistance frame 32 or 37. It is also possible to adopt an arrangement in which processing for autofocus adjustment and automatic exposure adjustment is executed based upon image data representing an image within the assistance frame 32 or 37. Autofocus and automatic exposure adjustment in conformity with the image of the main subject can be carried out. More specifically, in the image data obtained by imaging, the image data representing the image within the assistance frame is extracted from the digital signal processing circuit 17 by the CPU 21. Focus and exposure adjustment is performed by the CPU 21 using the extracted image data.

Figure 14:
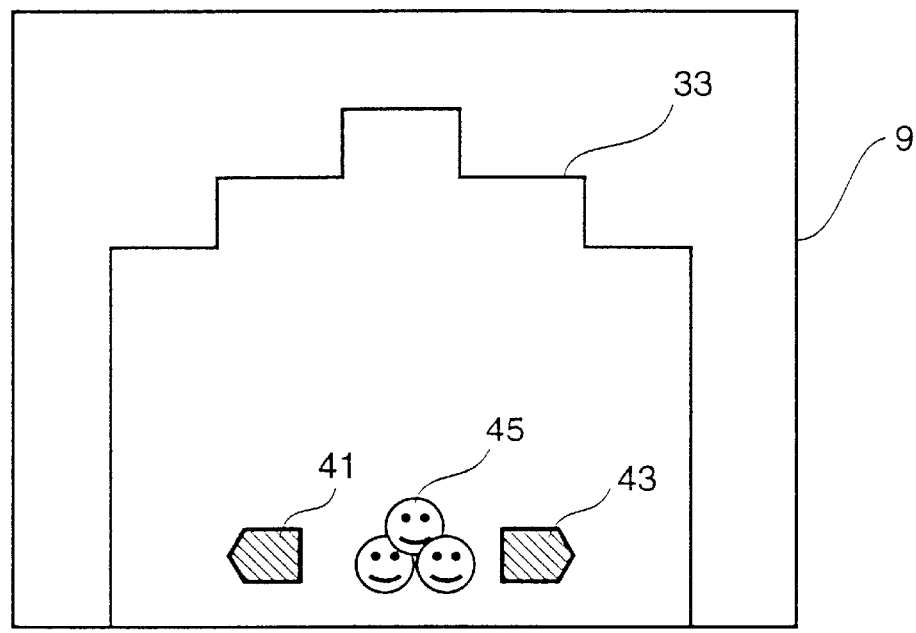
FIGS. 14 and 15 illustrate examples of assistance frames.
Figure 15:
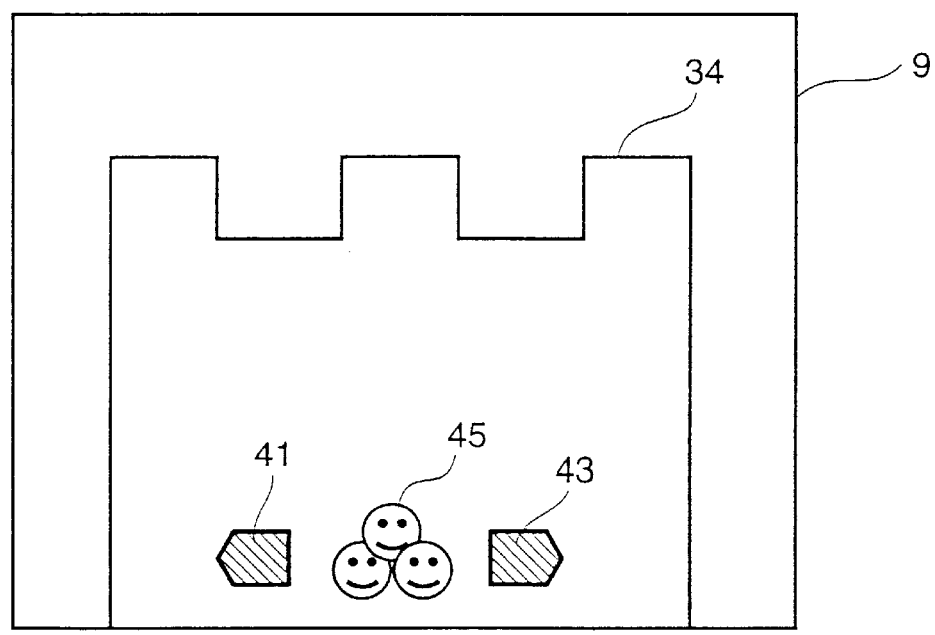
Figure 16:
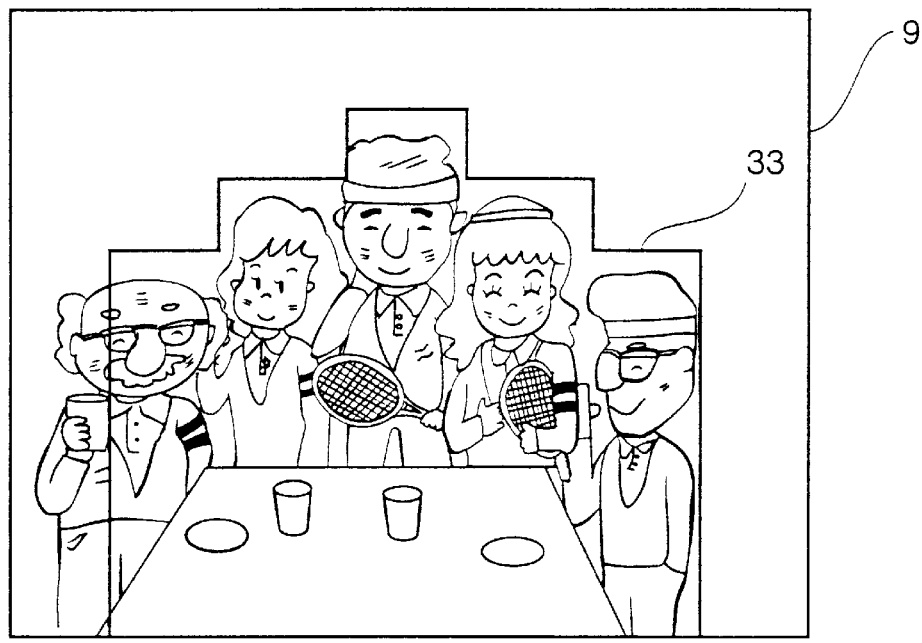
FIGS. 16 and 17 show examples of images displayed on a display screen of a liquid crystal display device.
Figure 17:
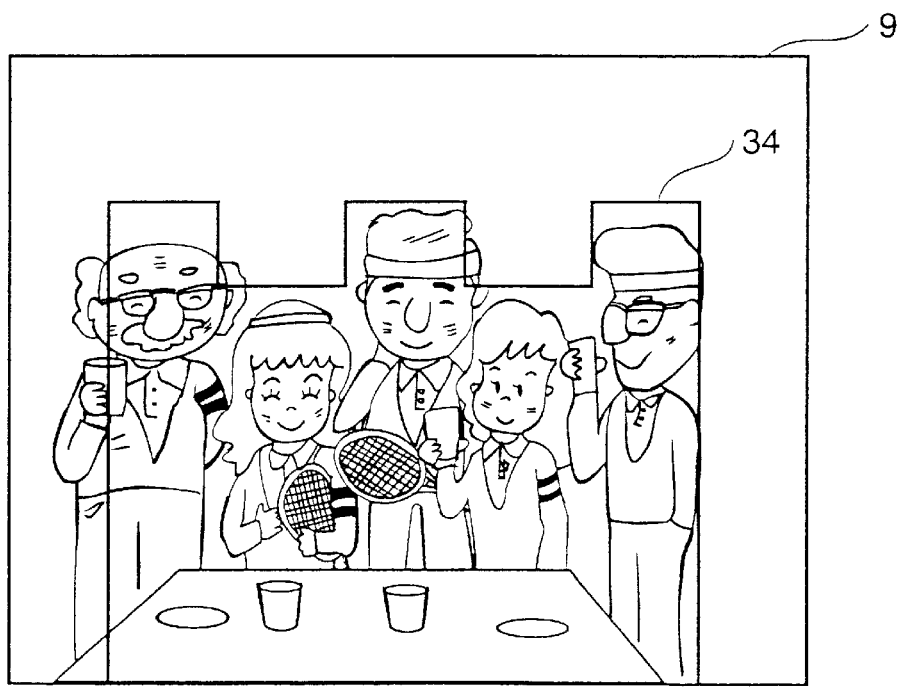

FIGS. 14 and 15 illustrate examples of assistance frames for group photography, which are other examples of assistance frames. FIGS. 16 and 17 show the group-photography assistance frames displayed on the image of a subject.

A group-photography assistance frame 33 shown in FIG. 14 is for taking a picture when a tall person is situated in the center of the picture. Here a captured image having good height balance is obtained (see FIG. 16).

A group-photography assistance frame 34 shown in FIG. 15 is for positioning tall persons and short persons is alternating fashion. An accented, rhythmic captured image is obtained (see FIG. 17).

Figure 18:
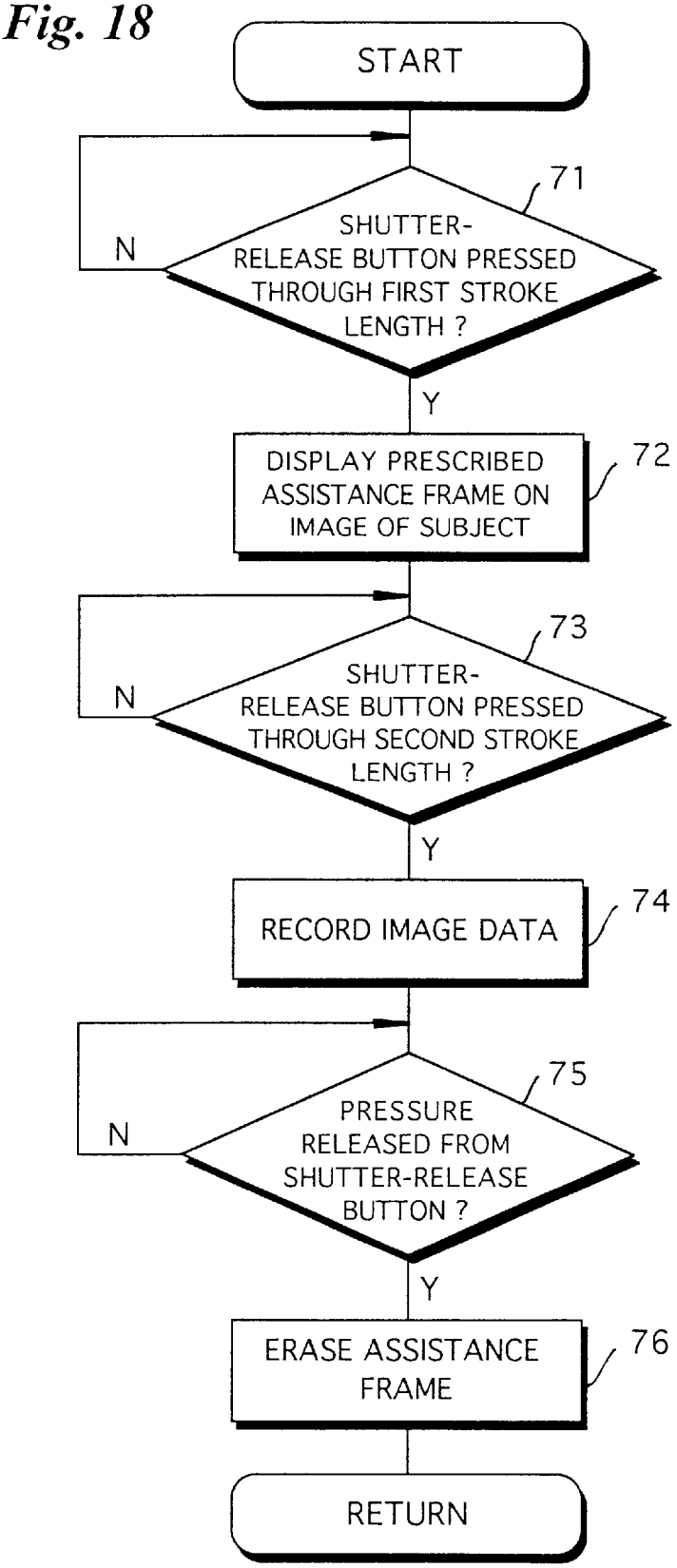
FIG. 18 is a flowchart illustrating the processing procedure of the digital still camera according to another embodiment of the present invention.

FIG. 18 is flowchart of processing in a digital still camera according to another embodiment of the present invention.

If the shutter-release button 2 is pressed through its first stroke length while the liquid crystal display device 9 is on, a prescribed assistance frame is displayed on the display screen of the liquid crystal display device 9 in a form superimposed on the captured image (step 72). The user decides the composition of the subject while referring to the assistance frame and then shoots the image of the subject.

When the user decides the composition and presses the shutter-release button 2 through its second stroke length ("YES at step 73), the image data representing the image of the subject is recorded on the memory card 25 in the manner described earlier (step 74).

If pressure being applied to the shutter-release button 2 is removed ("YES" at step 75), the assistance frame being displayed on the display screen of the liquid crystal display device 9 vanishes (step 76).

Since the assistance frame is displayed when the shutter-release button 2 is pressed through its first stroke length and the image data representing the image of the subject is about to be recorded, the assistance frame does not present an annoyance.

The assistance frame displayed on the liquid crystal display device 9 would be set up in advance in a set-up mode or the like.

Further, in the case of portrait photography, it may be so arranged that an AE program diagram is linked with this operation in such a manner that a diaphragm for defocusing background is used in the opened state. Furthermore, in case of scenic photography or photography of a human subject, it may be so arranged that an AE program diagram is linked with this operation in such a manner that the diaphragm is used in a stopped-down state so as to perform focusing over a wide range.

It goes without saying that displayed assistance frames are not limited to those described above, and an arrangement may be adopted in which the assistance frames displayed on the display screen of the liquid crystal display device 9 are in accordance with a variety of design methods such as dynamic symmetry, a triangular design, a contrast design, a design of vertical and horizontal straight lines, a curve design, an inverted-T design, a tunnel design, a diagonal-line design and an L-shaped design.

As many apparently widely different embodiments of the present invention can be made without departing from the spirit and scope thereof, it is to be understood that the invention is not limited to the specific embodiments thereof except as defined in the appended claims.

What is claimed is:

1. A digital still camera equipped with a composition assist function, comprising:

an imaging unit for sensing the image of a subject and outputting image data representing the image of the subject;

a display unit for displaying the image of the subject represented by the image data output from said imaging unit;

a move-command input unit for inputting a command to move a position at which the assistance lines are displayed;

a display controller for controlling said display unit so as to display assistance lines, which are for deciding composition for the purpose of taking a picture of the subject, in a form superimposed on the image of the subject being displayed on said display unit, and responds to a move command entered from said move-command input unit by displaying the assistance lines upon moving them without changing a form of the assistance lines; and a recording controller responsive to depression of a shutter-release button for recording the image data, which is output from said imaging unit, on a recording medium.

2. The camera according to claim 1, further comprising a display command switch for applying a command to display the assistance lines, wherein said display controller displays the assistance lines on said display unit in response to the display command applied by said display command switch.

3. The camera according to claim 1, further comprising a display control command switch for applying a command that is for the purpose of controlling said display unit, wherein said display controller responds to a first command from said display control command switch by turning said display unit on to display the image of the subject, responds to a second command from said display control command switch by displaying assistance lines in a form superimposed on the image of the subject, and responds to a third command from said display control command switch by turning off said display unit.

4. The camera according to claim 1, wherein the shutter-release button is capable of being pressed through first and second stroke lengths, said display controller responds to depression of the shutter-release button through its first stroke length by displaying the assistance lines on said display unit, and said display controller responds to depression of the shutter-release button through its second stroke length by recording the image data, which is output from said imaging unit, on the recording medium.

5. The camera according to claim 1, further comprising an adjustment unit for performing at least one of exposure adjustment and focus adjustment based upon image data representing an image within an area specified by the assistance lines.

6. The camera according to claim 1, further comprising a strobe for illuminating the subject with auxiliary light, wherein the assistance lines displayed on said display unit define a frame for portrait photography, and said frame for portrait photography being displayed on said display unit in a relationship identical with a positional relationship of the strobe disposed on a front side of the camera.

7. A method of controlling operation of a digital still camera equipped with a composition assist function, the camera having an imaging unit for sensing the image of a subject and outputting image data representing the image of the subject, a display unit for displaying the image of the subject represented by the image data output from said imaging unit, a move-command input unit for inputting a command to move a position, and a recording controller responsive to depression of a shutter-release button for recording the image data, which is output from said imaging unit, on a recording medium, said method including:

a step of controlling said display unit so as to display assistance lines, which are for deciding composition for the purpose of taking a picture of the subject, in a form superimposed on the image of the subject being displayed on said display unit; and responding to a move command entered from the move-command input init by displaying the assistance lines upon moving them without changing a form of the assistance lines.

* * * * *